US011809676B2

(12) United States Patent
Roloff et al.

(10) Patent No.: US 11,809,676 B2
(45) Date of Patent: Nov. 7, 2023

(54) TREE FROG COMPUTER NAVIGATION SYSTEM FOR THE HIERARCHICAL VISUALIZATION OF DATA

(71) Applicant: Integer Health Technologies, LLC, Arlington, TX (US)

(72) Inventors: Scott Roloff, Arlington, TX (US); William McCallum, Fort Worth, TX (US); Ken Grifno, The Colony, TX (US)

(73) Assignee: Integer Health Technologies, LLC, Arlington, TX (US)

( * ) Notice: Subject to any disclaimer, the term of this patent is extended or adjusted under 35 U.S.C. 154(b) by 605 days.

(21) Appl. No.: 15/950,681

(22) Filed: Apr. 11, 2018

(65) Prior Publication Data

US 2018/0300039 A1 Oct. 18, 2018

Related U.S. Application Data

(60) Provisional application No. 62/486,145, filed on Apr. 17, 2017.

(51) Int. Cl.
*G06F 3/04812* (2022.01)
*G06F 3/04817* (2022.01)
*G06F 16/901* (2019.01)

(52) U.S. Cl.
CPC ...... *G06F 3/04812* (2013.01); *G06F 3/04817* (2013.01); *G06F 16/9027* (2019.01)

(58) Field of Classification Search
CPC ............. G06F 16/9027; G06F 3/04812; G06F 3/04817
(Continued)

(56) References Cited

U.S. PATENT DOCUMENTS 8,185,824 B1 * 5/2012 Mitchell ............... H04L 41/044
715/734
10,088,974 B2 * 10/2018 Sinha .................... G06F 16/904
(Continued)

OTHER PUBLICATIONS

Dachselt, Raimund "Collapsible Cylindrical Trees: A Fast Hierarchical Navigation Technique" IEEE 2001 (Year: 2001).*
(Continued)

*Primary Examiner* — Stephen S Hong
*Assistant Examiner* — Nicholas Hasty
(74) *Attorney, Agent, or Firm* — Vincent J. Allen; James H. Ortega; Carstens, Allen & Gourley, LLP

(57) ABSTRACT

A computer navigation system that represents categories and sub-categories of material with functionally labeled objects connected in a hierarchical organization. Descending nodes represent more detailed subsets of material. Hovering the computer mouse over a node displays thumbnails of the items available under it, enabling the user to search for items without opening the respective pages, transforming a literal or verbal data filing and retrieval process into a more intuitive and easy to use visual one. Once the user hovers the computer mouse over the node with the desired item and sees its thumbnail the user clicks on the node, opening the screen from which the user can access that item (or upload a similar one), or clicks on the thumbnail to access the item directly. In addition, the system employs algorithms to group items into various categories and sub-categories and assigns them to the appropriate nodes.

3 Claims, 4 Drawing Sheets

Tree Frog Set-Up (Circles Connected to Smaller Circles)

*Circles in descending size indicate the level of the data in relation to the circle to which it is connected; while the length and width of the stem linking the circles indicates the connectedness of the underlying data sets (i.e. the shorter and wider the stem, the more connected the data)*

(58) Field of Classification Search
USPC .......................................................... 715/838
See application file for complete search history.

(56) References Cited

U.S. PATENT DOCUMENTS

2013/0282889 A1* 10/2013 Tito ..................... H04L 43/00
709/224
2015/0302113 A1* 10/2015 Rosenberg .......... G06F 16/9024
707/722

OTHER PUBLICATIONS

Dachselt, Ralmund "Collapsible Cylindrical Trees: A Fast Hierarchical Navigation Technique" IEEE 2001 (Year: 2001).*
Dachselt, Ralmund "Collapsible Cylindrical Trees: A Fast Hierarchical Navigation Technique: Technique" IEEE 2001 (Year: 2001).*
Hlawatsch, Marcel "Bubble Hierarchies" CAe 2014, p. 77-80 (Year: 2014).*

* cited by examiner

TREE FROG COMPUTER NAVIGATION SYSTEM FOR THE HIERARCHICAL VISUALIZATION OF DATA

This application claims the benefit of U.S. Provisional Patent Application No. 62/486,145, filed Apr. 17, 2017, entitled "Artificial Intelligence System Predicting Qualitative Information of Reported Data with Numerical and Color Coding Enabling Improved Data Visualization," and such application is incorporated by reference herein in its entirety.

TECHNICAL FIELD

The present disclosure is a computer navigation system for an individual (i.e. a user) using a computer along with a computer monitor and computer mouse. The navigation system employs the novel approach of representing categories and sub-categories of material with connected circles in a hierarchical organization on a single computer screen, with the length and width of the stems linking the circles indicating the connectedness of the underlying data sets. The system includes algorithms that organizes the items in such categories and sub-categories and determine the length and width of the stems. Descending circles in the hierarchy represent more detailed subsets of the material. Hovering the computer mouse over a circle (i.e. mousing over) displays thumbnails of the items available under it, transforming a literal or verbal data filing and retrieval process into a more intuitive and easier to use visual one.

BACKGROUND

When using a computer, large quantities of data (e.g. contracts, dashboards, documents, reports, etc.) are difficult for the user to comprehend. Organizing the data to display on a computer screen using language or simple icons alone can be confusing and over-whelming.

Generally, a user searches for a desired item by continuously opening and closing screens until the user finds what he or she is looking for-draining the computer and network's resources while wasting time.

There is a need for a system that will permit a user to navigate the items on a computer or network quickly and effectively.

SUMMARY

Disclosed herein is a computer navigation system that represents categories and sub-categories of material with functionally labeled circles connected in a hierarchical organization. The circles are linked by stems, with the length and width of the stem indicating the connectedness of the underlying data sets. Descending circles in the hierarchy represent more detailed subsets of the material. The invention is described using the words "tree frog" because a larger circle connected to smaller circles resembles the footprint of a tree frog on a windowpane.

Mousing over a circle displays thumbnails of the items available under it, enabling the user to search for items without opening the respective pages and viewing the actual items, transforming a literal or verbal data filing and retrieval process into a more intuitive and easier to use visual one. Once the user mouses over the circle with the desired item and sees its thumbnail the user clicks on the circle, opening the screen from which the user can access that item (or upload a similar item), or clicks on the thumbnail to access the item directly.

To the extent that data has not been previously designated to appear at specific circles by the computer user or network administrator, the system employs algorithms to group those items into various categories and sub-categories, first by function or sub-function and then by granularity, both on a contextual and numeric basis. For example, algorithms identifying certain key words or data sets may group together all human resource records at one level, and then subdivide the payroll reports into one sub-level and the time reports into another. Similarly, the algorithms determine the length and width of the stems linking the circles based on the connectedness of the underlying data sets.

This navigation system transforms the literal display of data into a visual one on a single computer screen and improves computer and network performance by decreasing the resources used to open and close screens while searching for the right one, while increasing the effectiveness and speed of the user's search and/or filing process.

BRIEF DESCRIPTION OF THE DRAWINGS

A complete understanding of the present disclosure may be obtained by reference to the accompanying drawings in conjunction with the following detailed description.

DETAILED DESCRIPTION

Various objects, features, aspects and advantages will become more apparent from the following detailed description along with the accompanying drawings. The principles are described with specificity; however, the description and drawings are not intended to limit the scope of the principles disclosed herein. Rather, the principles might also be embodied in other ways and include different steps or combinations of steps similar to the ones described herein.

Disclosed herein is a computer navigation system for an individual (i.e. a user) using a computer along with a computer monitor and computer mouse. The navigation system employs the novel approach of representing categories and sub-categories of material with functionally labeled circles that are connected in a hierarchical organization on a single computer screen with the length and width of the stems linking the circles indicating the connectedness of the underlying data sets. Descending circles in the hierarchy represent more detailed subsets of the material. The invention is described using the words "tree frog" because a larger circle connected to smaller circles resembles the footprint of a tree frog on a windowpane.

Figure 1:
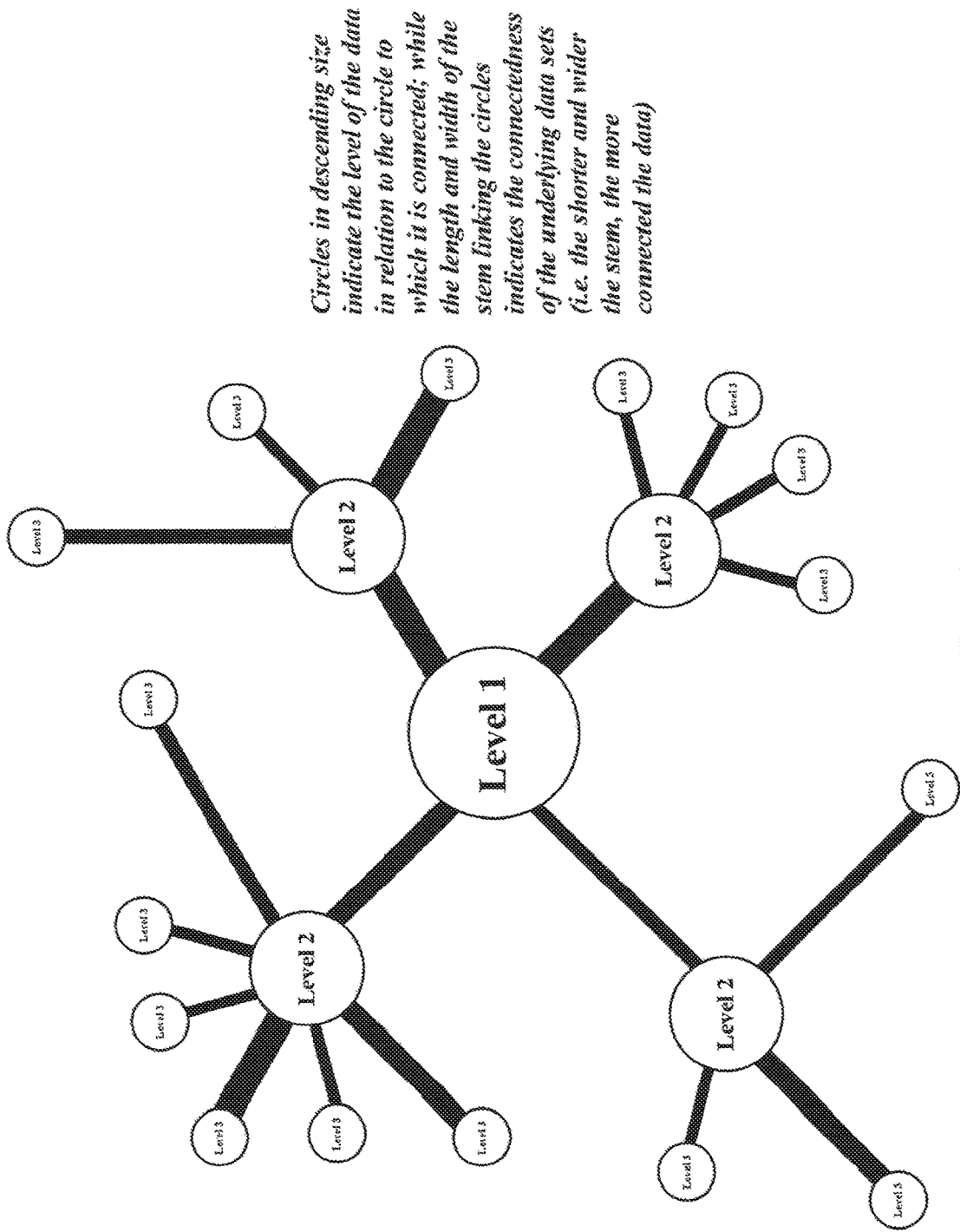
FIG. 1 depicts the computer navigation system employing ever smaller connected circles to represent the categories and sub-categories of material, along with the varying lengths and widths of the stems linking the circles indicating the connectedness of the underlying data sets.

FIG. 1 depicts the computer navigation system employing ever smaller connected circles to represent the categories and sub-categories of material, with varying lengths and widths of stems indicating the connectedness of the underlying data sets. Level 1 is the overall or umbrella category, which may contain high level dashboards, reports and other items. Level 2 circles are sub-categories of Level 1. For example, in a human resource setting this level could include sub-categories for personnel, payroll, and employee benefits. Level 3 are further sub-categories of the respective Level 2 circle. For example, the Level 3 circles under employee benefits could include health insurance, life insurance and wellness programs. FIG. 1 only depicts three levels, although the system can produce as many levels as desired.

With respect to the stems, the length of the stem may indicate one coefficient of connectedness between the data sets underlying the linked circles, while the width of the stem another.

To enhance visualization of different pods, each pod can be a different color.

The data sets underlying different pods may intersect. For example, if one pod categorized employee benefits information and another pod factory operational data, the circle for employee hospital medical claims in the employee benefits pod might intersect with the employee time and attendance circle in the factory operational data pod to report the anomaly of employees shown as being in the hospital in one data set while at the same time-being-shown at work in the factory under another.

Figure 2:
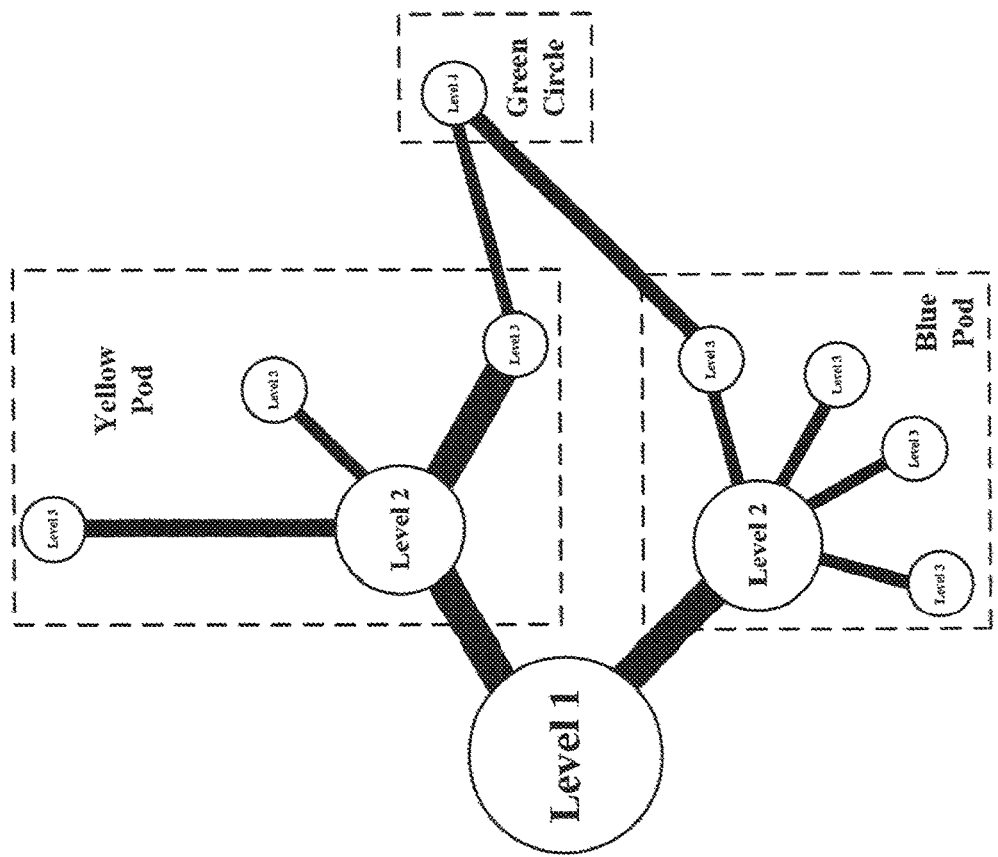
FIG. 2 depicts two pods (a pod being a higher level circle with the smaller circles branching out from it, e.g. a Level 2 circle and its linked Level 3 circles) intersecting to create a new data set linked to both.

FIG. 2 depicts such an intersection. When pods are color coded, the circle for the resulting inter-connected data set can take the resulting color of the combining sets. If the employee benefits pod was yellow, and the factory operational data pod was blue, the intersecting circle for employees shown in the hospital and at work at the same time could be green (Yellow+Blue=Green).

Hovering the computer mouse over a circle (i.e. mousing over) displays thumbnails of the items available under it, enabling the user to search for items without opening the respective pages and viewing the actual items, transforming a literal or verbal data filing and retrieval process into a more intuitive and easier to use visual one.

Figure 3:
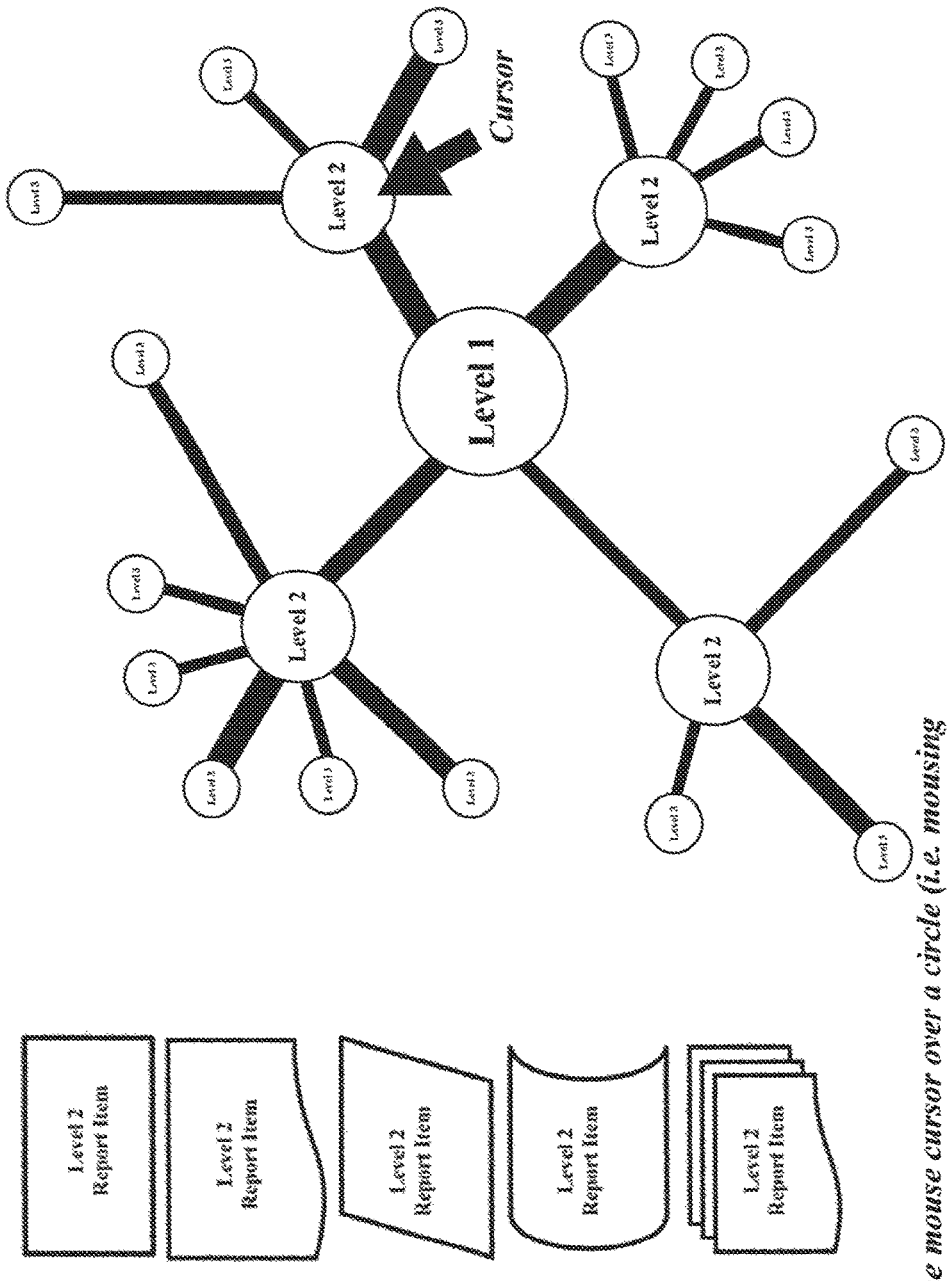
FIG. 3 depicts the computer navigation system displaying thumbnails of the items (contracts, dashboards, documents, reports, etc.) under a category level when the computer's curser mouses over the respective circle.

FIG. 3 depicts the computer navigation system displaying thumbnails of the items (contracts, dashboards, documents, reports, etc.) under a category level when the computer's curser mouses over the respective circle.

Once the user mouses over the circle with the desired item and sees its thumbnail the user clicks on the circle, opening the screen from which the user can access that item (or upload a similar item). Alternatively, the user can click on the thumbnail to access the item directly.

In addition to stream-lining the search and retrieval process, to the extent that data has not been previously designated to appear at specific circles by the computer user or network administrator, the system employs algorithms to group items into various categories and sub-categories, first by function or sub-function and then by granularity, both on a contextual and numeric basis, while determining the appropriate lengths and widths of the stems linking the circles to show the connectedness of the underlying data based on selected coefficients. For example, algorithms identifying certain key words or data sets may group together all human resource records at one level, and then subdivide the payroll reports into one sub-level and the employee benefits reports into another.

Figure 4:
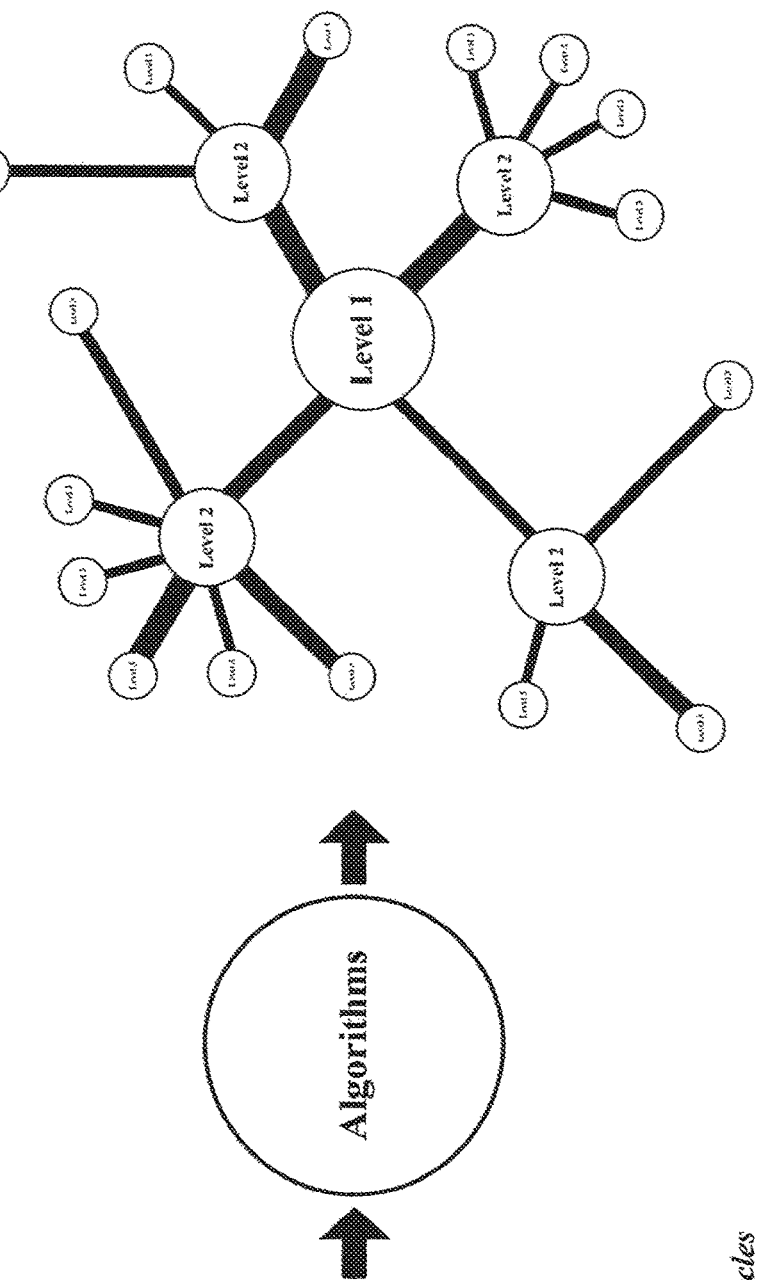
FIG. 4 depicts the algorithms sifting through items and grouping them into categories and sub-categories, and then assigning them to the appropriate circles with the length and width of the linking stem indicating the connectedness of the underlying data sets.

FIG. 4 depicts the system's algorithms sifting through items and grouping them by subject matter, and then assigning them to the appropriate level of granularity for display within a pod, while connecting the pod's circles with stems of the appropriate length and width based on the connectedness of the underlying data.

The system transforms the literal display of data into a visual one on a single computer screen and improves computer and network performance by decreasing the resources used to open and close screens while searching for the right one, while increasing the effectiveness and speed of the user's search and/or filing process.

This detailed description is not intended to be limiting or represent an exhaustive enumeration of the principles disclosed herein. It will be apparent to those of skill in the art that numerous changes may be made in such details without departing from the spirit of the principles disclosed herein.

We claim:

1. A system of visual navigation on a single computer screen for an individual (i.e. a user) using a computer along with a computer monitor and computer mouse, comprising:

representing groups of items with functionally labeled circles connected in a hierarchical order;

organizing that order with a central circle branching off into several smaller circles, and from each of those smaller circles several more even smaller circles, etc., with each circle and the first level of smaller circles branching out from it forming a pod (and each pod may, but is not required to, be a different color);

representing more detailed subsets of the material as the circles descend;

linking the circles with stems, with the lengths and widths of the stems indicating the connectedness of the underlying data based on selected coefficients;

displaying thumbnails of the items available under a circle when the user hovers the computer mouse over it; and opening the screen from which the user can access such items (or upload similar items) when the user clicks the computer mouse over the circle, or alternatively accessing the item directly when the user clicks on its thumbnail.

2. The system of claim 1, as well as comprising:

employing algorithms to group items into various categories and sub-categories, first by function or sub-function and then by granularity, both on a contextual and numeric basis;

assigning each such item to the appropriate circle; and linking each circle with a stem of the appropriate length and width to indicate the connectedness of the underlying data sets.

3. The system of claim 1, was well as comprising:

intersecting a circle under one pod, with a circle under another to create a new circle when the underlying data is related to both pods; and assigning a color to the new circle by combining the colors of the intersecting pods when color coding is used.

* * * * *